US009754203B2

(12) United States Patent
Di Castro et al.

(10) Patent No.: US 9,754,203 B2
(45) Date of Patent: Sep. 5, 2017

(54) ANALOG MULTIPLIER USING A MEMRISTIVE DEVICE AND METHOD FOR IMPLEMENING HEBBIAN LEARNING RULES USING MEMRISOR ARRAYS

(71) Applicant: Technion Research and Development Foundation LTD., Haifa (IL)

(72) Inventors: Dotan Di Castro, Haifa (IL); Daniel Soudry, Haifa (IL); Shahar Kvatinsky, Ramat Gan (IL); Asaf Gal, Binyamina (IL); Avinoam Kolodny, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 622 days.

(21) Appl. No.: 14/219,007

(22) Filed: Mar. 19, 2014

(65) Prior Publication Data

US 2014/0289179 A1 Sep. 25, 2014

Related U.S. Application Data

(60) Provisional application No. 61/804,671, filed on Mar. 24, 2013.

(51) Int. Cl.
*G06N 3/063* (2006.01)
*G06N 3/04* (2006.01)
*G06G 7/163* (2006.01)

(52) U.S. Cl.
CPC ........... *G06N 3/0635* (2013.01); *G06G 7/163* (2013.01); *G06N 3/049* (2013.01)

(58) Field of Classification Search
CPC ........... G06N 3/02; G06N 3/06; G06N 3/0635
See application file for complete search history.

(56) References Cited

PUBLICATIONS

Kavehei, O., et al. "Memristor-based synaptic networks and logical operations using in-situ computing." Intelligent Sensors, Sensor Networks and Information Processing (ISSNIP), 2011 Seventh International Conference on. IEEE, 2011.*
Merrikh-Bayat, F., et al. "Memristor-based circuits for performing basic arithmetic operations." arXiv preprint arXiv:1008.3452 (2010).*

* cited by examiner

*Primary Examiner* — Kakali Chaki
*Assistant Examiner* — Eric Nilsson
(74) *Attorney, Agent, or Firm* — Reches Patents

(57) ABSTRACT

A device, comprising: an array of cells, wherein the cells are arranged in columns and rows; wherein each cell comprises a memristive device; an interfacing circuit that is coupled to each cell of the array of cells; wherein the interfacing circuit is arranged to: receive or generate first variables and second variables; generate memristive device input signals that once provided to memristive devices of the array will cause a change in a state variable of each of the memristive devices of the cells of the array, wherein the change in the state variable of each of the memristive devices of the cells of array reflects a product of one of the first variables and one of the second variables; provide the memristive device input signals to memristive devices of the array; and receive output signals that are a function of at least products of the first variables and the second variables.

23 Claims, 12 Drawing Sheets

ANALOG MULTIPLIER USING A MEMRISTIVE DEVICE AND METHOD FOR IMPLEMENING HEBBIAN LEARNING RULES USING MEMRISOR ARRAYS

RELATED APPLICATIONS

This application claims priority from U.S. provisional patent 61/804,671 filing date Mar. 24, 2013 which is incorporated herein by reference.

BACKGROUND OF THE INVENTION

Engineering truly intelligent machines is one of the more exciting and challenging frontiers of modern hardware design. The field of machine learning (ML) has achieved remarkable progress in the mathematical formulation of performance bounds and algorithms to many classes of problems such as pattern recognition, natural language processing, clustering, and time series prediction.

Recently, there is an increasing involvement of ML algorithms in many of the modern life aspects, and specifically, in mobile devices and cloud computing. This generates an increasing demand for intensive ML calculations to be performed fast using low area and low power consumption. Therefore, new methodologies must be developed to cope with such demands.

Many ML algorithms require updating big matrices of values termed synaptic weights. The power of ML stems from the rules used for updating the weights. These weights are usually local, in the sense they depend only on information available at the site of the updated synapse, and the update procedure occurs continuously during the normal operation of the system. Such rules go under the general name of Hebbian, named after the physiologist Donald Hebb, who first suggested the distributed mechanism underlying neural function.

Conventional implementation of ML algorithms in hardware utilizes standard digital memory arrays to store these matrices, physically separated from the computing circuits. This architecture heavily limits the usability and scalability of ML hardware and provides small advantage over software-based implementation on general purpose hardware.

There is a growing need to provide hardware systems that are compact, can execute general ML algorithms and are not limited to narrow, specific purposes such as Synaptic Time Dependent Plasticity (STDP), like learning rules.

SUMMARY OF THE INVENTION

According to an embodiment of the invention there is provided a system and a method to implement general adaptive algorithms (i.e., Hebbian rules) based on memristors. While previous proposed memristor-based adaptive circuits are suitable for spike-based implementations (especially STDP), the proposed method is suitable for implementations with continuous input and output, which are more useful for practical adaptive algorithms.

The proposed method is based on one memristive device to store the synaptic weight and two CMOS transistors to control the circuit. Alternative synapse structures to are also possible for different number of transistors for each synapse.

An analog multiplier, may include an input circuit, a memristive device, and an output circuit; wherein the memristive device is coupled between the input circuit and the output circuit; wherein the input circuit may be arranged to receive or generate a first variable and a second variable; generate at least one memristive device input signal that once provided to the memristive device will cause a change in a state variable of the memristive device, wherein the change in the state variable of the memristive device reflects a product of first and second variables; provide the memristive device at least one memristive device input signal; wherein the output circuit may be arranged to evaluate the state variable of the memristive device and to generate information about the product or to calculate any function that is responsive to the state variable.

The derivative of the state variable may equal an output of a first function applied on the state variable and on the at least one memristive input signal; and an output signal of the memristive device may equal an output of a second function applied on the state variable and on the at least one memristive device input signal;

wherein the input circuit may be arranged to generate the at least one memristive device in response to the first and second functions.

The memristive device may be a memristor, resistive RAM, spin-transfer torque MRAM, phase-change memory, programmable metallization cell, or any other two-port device with varying resistance, where the change depends on the voltages (or currents) of the input circuit or the the output circuit (or both).

The input circuit may be arranged to generate a memristive device input signal of a value that represents the first variable and to cause the memristive device to receive the value during a duration that represents the second variable.

At least one memristive device input signal may be a voltage signal.

At least one memristive device input signal may be a current signal.

The input circuit may include first and second transistors, the first transistor may be arranged to provide positive memristive device input signals and the second transistor may be arranged to provide negative memristive device input signals.

According to an embodiment of the invention there may be provided a device that may include an array of cells, wherein the cells are arranged in columns and rows; wherein each cell may include a memristive device; an interfacing circuit that is coupled to each cell of the array of cells; wherein the interfacing circuit may be arranged to receive or generate first variables and second variables; generate memristive device input signals that once provided to memristive devices of the array will cause a change in a state variable of each of the memristive devices of the cells of the array, wherein the change in the state variable of each of the memristive devices of the cells of array reflects a product of one of the first variables and one of the second variables; provide the memristive device input signals to memristive devices of the array; and receiving output signals that are a function of at least products of the first variables and the second variables.

The interfacing circuit may be arranged to generate memristive device input signals of values that represents the first variables and to cause the memristive devices to receive the values in durations that represent the second variables.

The interfacing circuit may be arranged to provide the same first memristive device input signal to all memristive devices of a single row of the array; send the same second memristive device input signal to all memristive devices of a single column of the array; and to read in parallel the state of memristive devices of a single column of the array.

The interfacing circuit may be arranged to receive, from each column of cells, an aggregate current that is a sum of output currents of memristive devices of cells of the column.

The interfacing circuit and the array of cells form an array of synapses.

The device may include a machine learning controller that may be arranged to execute machine learning algorithms that involve feeding to the interfacing circuit the first and second variables.

According to an embodiment of the invention there may be provided a method for analog multiplication of a first and a second variable, the method may include generating of receiving the first variable and the second variable; generating at least one memristive device input signal that once provided to the memristive device will cause a change in a state variable of the memristive device, wherein the change in the state variable of the memristive device reflects a product of first and second variables; providing the memristive device at least one memristive device input signal; and evaluating the state variable of the memristive device and generating information about the product or to calculate any function that is responsive to the state variable.

The memristive device may be a memristor.

The method may include generating a memristive device input signal of a to value that represents the first variable and to cause the memristive device to receive the value during a duration that represents the second variable.

At least one memristive device input signal is a voltage signal.

At least one memristive device input signal is a current signal.

The method may include providing by a first transistor memristive device input signals and providing by a second transistor negative memristive device input signals.

According to an embodiment of the invention there may be provided a method that may include receiving or generating first variables and second variables; generating memristive device input signals that once provided to memristive devices of an array of cells will cause a change in a state variable of each of the memristive devices of the cells of the array, wherein the change in the state variable of each of the memristive devices of the cells of array reflects a product of one of the first variables and one of the second variables; providing the memristive device input signals to memristive devices of the array; and receive output signals that are a function of at least products of the first variables and the second variables.

The memristive device may be a memristor.

The method may include generating memristive device input signals of values that represent the first variables and causing the memristive devices to receive the values during durations that represent the second variables.

The method may include providing a same first memristive device input signal to all memristive devices of a single row of the array; sending a same second memristive device input signal to all memristive devices of a single column of the array and to read in parallel; and reading in parallel a state of memristive devices of a single column of the array.

The method may include receiving, from each column of cells, an aggregate current that is a sum of output currents of memristive devices of cells of the column The interfacing circuit and the array of cells may form an array of synapses.

The method may include applying a machine learning algorithm that involves feeding the first and second variables.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
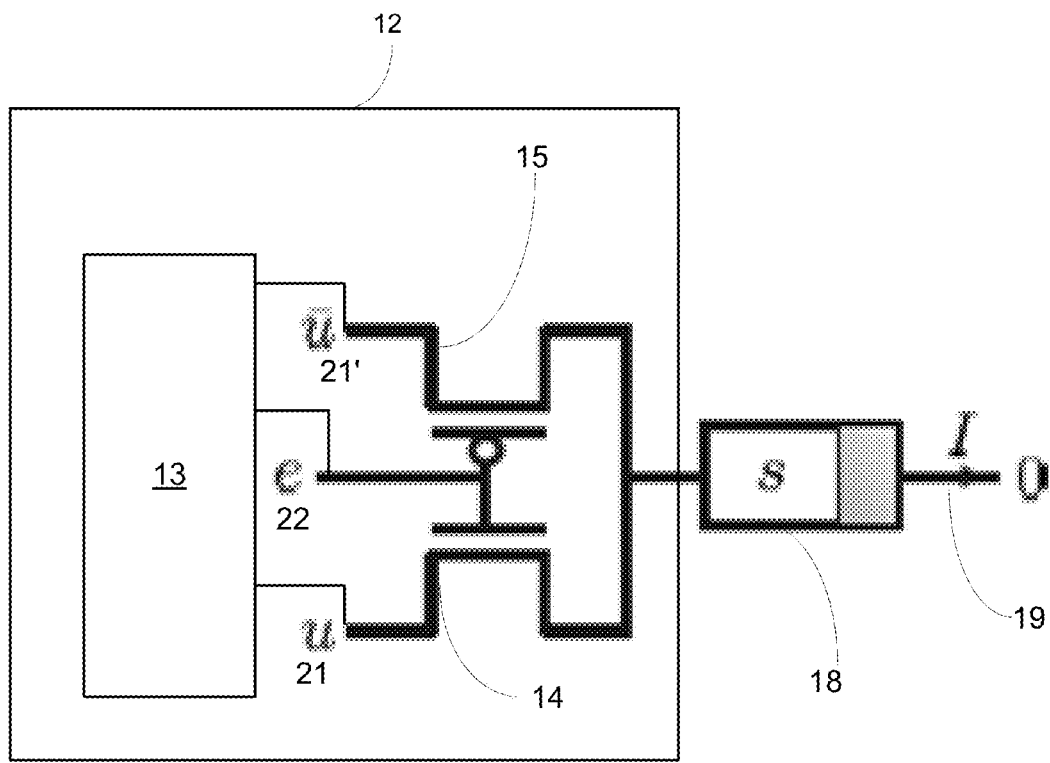
FIG. 1 is a block diagram of an analog multiplier according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced ithout these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

Two main computational bottlenecks in many machine learning algorithms are given by "matrix*vector" product operation ($r^{(k)}=W^{(k)}p^{(k)}$) and a "vector*vector" outer product operation ($W_{nm}^{(k+1)}=W_{nm}^{(k)}+\eta x_m^{(k)}y_n^{(k)}$), with k being the time index.

Both are of order O(M*N), where M and N are the sizes of the input and output vectors. There are provided memristive arrays (see for example FIG. 2) that are designed specifically to deal with these bottlenecks, by implementing massive parallel computation, using memristor arrays. This implementation has a relatively small number of components in each array element—one memristor and two transistors (FIG. 1) or one memristor and a single transistor (FIG. 3).

The physical grid-like structure of the arrays implements the "matrix*vector" product operation, while the memristor dynamics enable us to perform the "vector*vector" outer product operation, using a "time*voltage" encoding paradigm.

The memristors may be used together with "time*voltage" encoding, which allows us to perform a mathematically accurate "vector*vector" outer product operation using a small number of components in each array element.

A direct implementation of this product in the current\voltage domain using a small number of transistors can be only approximate which may cause buildup of errors. Furthermore the use of memristor arrays allows high density and low power consumptions.

These memristor arrays are not limited to spike-like inputs and may receive general input.

A memristor is a device that maintains a nonlinear relation between charge, the integral of current $q(t)=\int_{-\infty}^{t}i(t')dt'$, and "flux", the integral of voltage $\phi(t)=\int_{-\infty}^{t}v(t')dt'$. Because the relationship $\phi=M(q)$ is strictly monotone it is therefore reversible $q=M^{-1}(\phi)$.

Accordingly:

$$i(t) = G(s(t))v(t)$$
$$\frac{ds(t)}{dt}v(t).$$

Where $s(t)=\phi(t)$ is the state variable of the memristor and $$G(x) = \left(\frac{dM(x)}{dx}\right)$$

is the conductivity.

Note that s(t) (being equal to $\phi(t)$) is redefined to emphasize that this is the state variable in this "classical" model for the memristor.

The following text may refer to a memristor but is applicable mutatis mutandis to memristive devices (even those that differ from a memristor).

FIG. 1 illustrates an analog multiplier 10 according to an embodiment of the invention. The analog multiplier 10 may act as a memristive synapse.

The analog multiplier 10 includes an input circuit 12, a memristor 18 and an output circuit 19.

The input circuit 12 includes a signal generator 13, first and second transistors 14 and 15. The first transistor 14 is an N-type MOSFET transistor and the second transistor 15 is a P-type MOSFET transistor. The gates of both transistors are to connected to each other are arranged to receive an enable signal e from the signal generator 13. An input port of memristor 18, the drain of first transistor 14 and the source of second transistor 15 are connected to each other. The source of first transistor 14 may receive positive memristive device input signals (u) and the source of second transistor 15 may receive negative memristive signals ($\bar{u}$). The enable signal E determines the period during which either one of the negative of positive memristive device signals reaches the memristor 18.

It is assumed that each of these transistors has a threshold voltage Vt and gain K and that the absolute value of u is smaller than Vt so that when E=0 both transistors do not conduct.

Furthermore (Vdd-|U|-Vt)*K>>G(s(t)) so that when E=Vdd the first transistor 14 operates in a linear region, the second transistor 15 is closed and the voltage on the memristor is u. When E=−Vdd the second transistor 15 operates in a linear region, the first transistor 14 is closed and the voltage on the memristor is −U.

Figure 2:
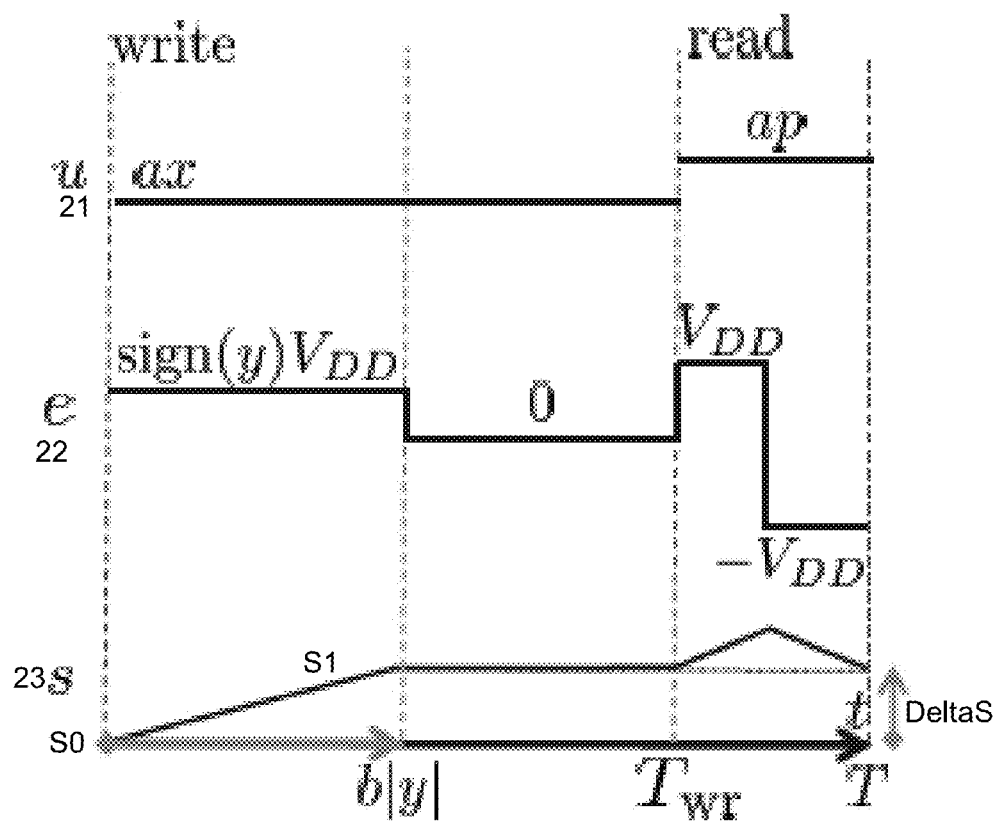
FIG. 2 is a timing according to an embodiment of the present invention.
Figure 3:
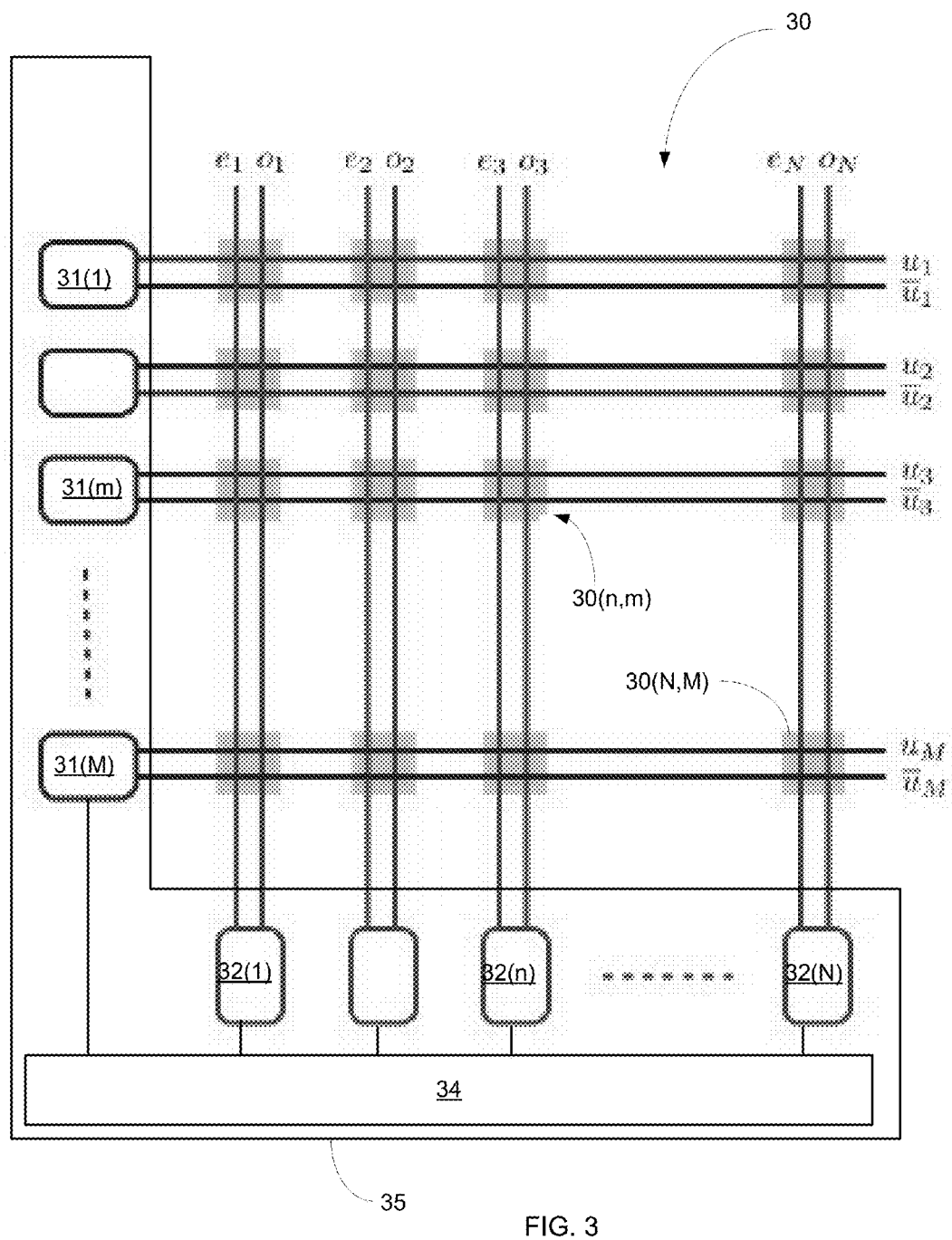
FIG. 3 is a block diagram of an array according to an embodiment of the present invention.

FIG. 2 is a timing diagram 20 illustrating signals u (or U) 21, e (or E) 22 and state variable S (or s) 23 according to an embodiment of the invention.

Table 1 provides an illustration of the signals that appear in the timing diagram.

TABLE 1

| Time | signal | | | | |
|---|---|---|---|---|---|
| | U 21 | E 22 | S 23 | ds/dt | Δs |
| Zero to b\|y\| | ax | Sign(y)Vdd | Increases from s0 to s1 in a linear manner | sign(y) ax | |
| B\|y\| till end of write period | ax | 0 | Constant (s1) | 0 | |
| At the end of the write period | | | | | abxy |
| First part of write period $T_{wr} - (T_{wr} + T_{rd}/2)$ | ap | Vdd | Increase in a linear manner | ap | |
| Second part of write period $(T_{rd}/2 + T_{wr}) - (T_{rd} + T_{wr})$ | ap | −Vdd | Decreases in a linear manner to s1 | −ap | |
| End of read period | | | | | Read period does not change Δs |

The memristor output port is connected to an output circuit 19 that may read a current that flows through the memristor in order to determine the conductivity (and hence evaluate the state variable) of the memristor 18. The output circuit 19 may include a current sensor that is grounded.

Updating Synaptic Weights

As many machine learning algorithms, each trial (a single presentation of a specific input) includes two phases: the computing phase ("read"), in which the values stored in the synapses are used to produce some arithmetic operation on the inputs, and the updating phase ("write"), in which the synaptic weights are updated according to the algorithm. These operations are achieved by inducing different voltage values on the input lines to the synapse as shown in FIG. 2.

The write phase is illustrated by the first three rows of table 1.

To update the memristor internal state S so that $\Delta s = \eta xy$ (where x and y are terms defined by the specific algorithm), the synaptic weight W should be defined as $W = a(\bar{g} + \hat{g}s)$ and $\eta = a\hat{g}ab$ and receive the following update rule:

$$W^{(k+1)} = W^{(k)} + \eta x^{(k)} y^{(k)}.$$

The read phase is implemented by the last three columns of table 1. The read phase does not affect the $\Delta s$ that existed at the end of the write phase.

To minimize inaccuracies due to changes in the conductance of the memristor during the read phase, the output may be sampled in the beginning or the end of the read phase. The output current of the synapse is:

$$I = (\bar{g} + \hat{g}s)u = a(\bar{g} + \hat{g}s)p = Wp, \text{ as required.}$$

Network architecture scheme. Every node in the network is a memristor-based synapse, connected to the input, output, and enable signals.

The synapses described in the previous section can be organized in a 2D (N×M) square array 30 as shown in FIG. 3, where each synapse $30(m,n)$ is indexed by (m,n), m ranges between 1 and M and n ranged between 1 and N.

Each row in the array (the m'th row) corresponds to a single input circuit $31(m)$ and shares the two horizontal input lines U(m) and $\overline{U(m)}$.

Each column (the n'th column) corresponds to a single output and enable component $32(n)$, and shares the enable line E(n) and output lines.

The total current in each output line equals to the sum of the individual currents produced by the synapses driving the line and equals:

$$I_n = \Sigma_m I_{nm} = a \Sigma_m (\bar{g} + \hat{g}s_{nm}) p_m = (Wp)_n = (r)_n$$

Input circuits 31(1)-31(M), single output and enable components 32(1)-32(N) and signal generator 34 belong to interfacing circuit 35. Each cycle of read is equivalent to a multiplication of a N×M matrix by a vector r=Wp while each write cycle is equivalent to incrementing each element of the matrix according to an outer product between two vectors: $\Delta W = \eta xy^T$.

Implementing Negative Weights

The synaptic weights $W_{nm}$ are usually required to have negative values as well. The proposed implementation, however, is limited to positive weights since $W_{nm}$ is proportional to the memristor conductance, which is strictly positive. To overcome this limitation, it is possible to subtract a $\bar{g}\Sigma_m p_m$ from all the components of r, so that the weights are redefined as $W^{(k)}{}_{nm} = a\hat{g}s^{(k)}{}_{nm}$ and can take both positive of negative weighs.

This implementation may require adding another array that will assists in the subtraction process.

It should be noted that the total current in each output line equals to the sum of the individual currents produced by the synapses driving the line and equals:

$$I_n = \Sigma_m I_{nm} = a \Sigma_m (\bar{g} + \hat{g}s_{nm}) p_m = (Wp)_n = r_n,$$

with $W_{nm} = a\bar{g} + a\hat{g}s_{nm}$. In order to offset W we subtract from all the output currents $I_n$ a factor of $\Delta I_n = a\bar{g}\Sigma_m p_m$, so that now $I_n = \Sigma_m I_{nm} - \Delta I_n = a\hat{g}\Sigma_m s_{nm} p_m = (Wp)_n = r_n,$ With $W_{nm} = a\hat{g}s_{nm}$, so it can now store negative values. Such a subtraction can be made in various ways. For example, we can generate $-\Delta I_n$ using an auxiliary array of resistors with conductivity $\bar{g}$, with similar design as the synaptic array of the invention, as shown in the drawing below for M=N=3

Figure 4:
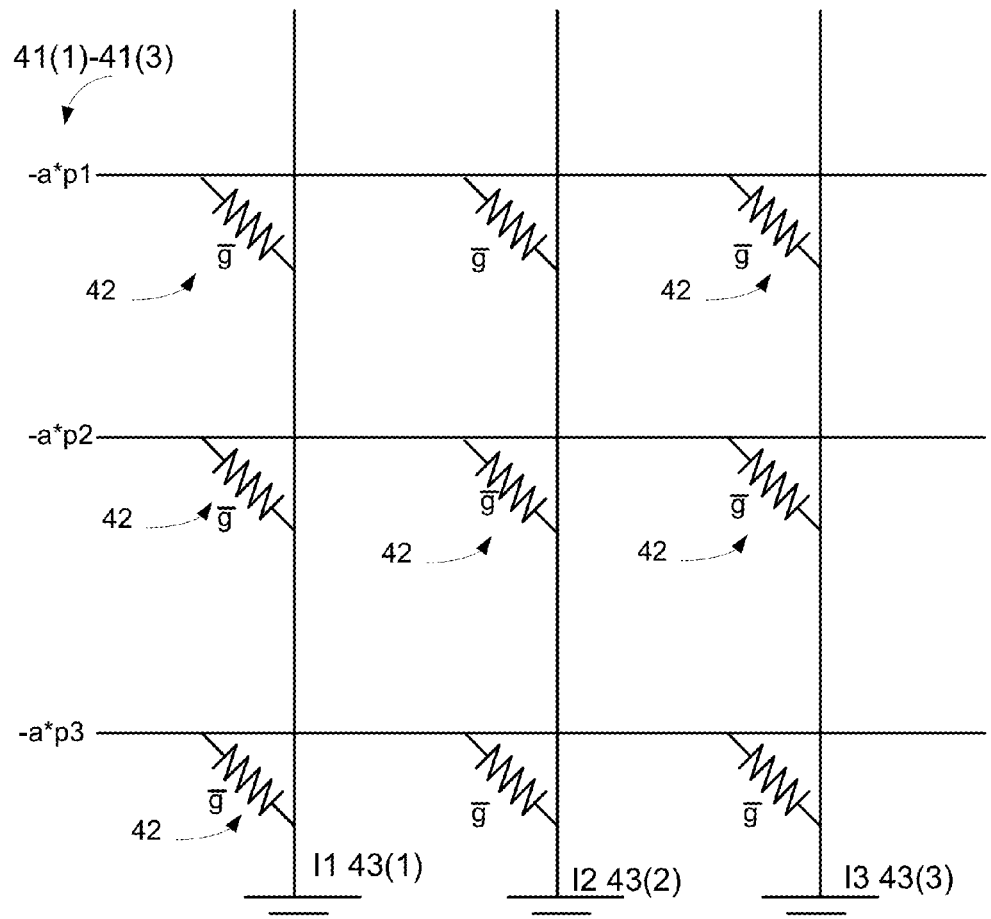
FIG. 4 is a block diagram of a pair of arrays according to an embodiment of the present invention.

FIG. 4 illustrates a 3×3 array 40 that feeds each row with negative weights denoted $-a*p1$, $-a*p2$ and $-a*p3$ 41(1)-41(3), wherein resistors 42 having resistance of $\bar{g}$ are connected between the row lines and the column lines so that each of the three column currents I1 till I3 43(1)-43(3) equals $-a*\bar{g}(p1+p2+p3)$. The column currents of both arrays are summed Alternatively, the array of FIG. 3 can further include horizontal input line to each row of the array. These lines will be connected to the output line in each synapse via a resistor with fixed conductivity conductance $\bar{g}$. Each of the new input lines will receive the value $-ap_m$ during the read operation to get the desired functionality.

Thus—when an output and enable circuit will read the current of a column it will read:

$$I_n = \Sigma_m I_{nm} - a\bar{g}\Sigma_m p_m = a\hat{g}\Sigma_m s_{nm} p_m = (Wp)_n = r_n,$$

Compact Synapse

It is possible to reduce the number of transistors in each synapse from two to one—with the price of a longer write cycle.

Figure 5:
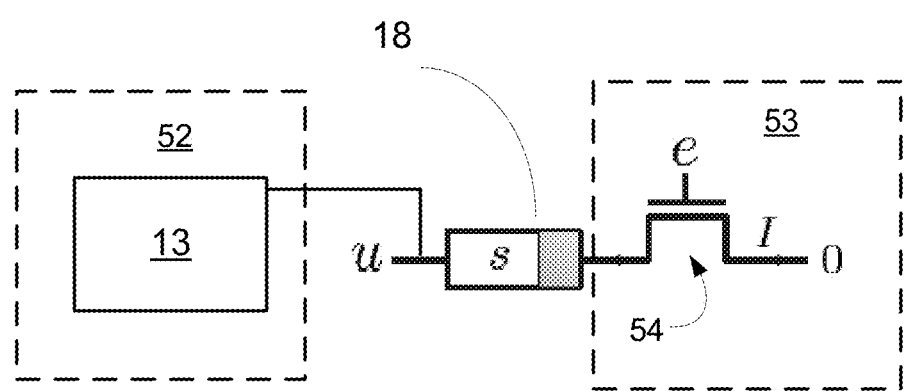
FIG. 5 is a block diagram of an analog multiplier according to an embodiment of the present invention.

FIG. 5 illustrates an analog multiplier 50 according to an embodiment of the invention. The analog multiplier 50 may act as a memristive synapse.

The analog multiplier 50 includes an input circuit 52, a memristor 18 and an output circuit 53.

The input circuit 52 includes a signal generator 13. The output circuit 53 includes a first transistor 54 that is an N-type MOSFET transistor and a current sensor (not shown).

The gate of first transistor 52 receives an enable signal E from the signal generator 13. An input port of memristor 18 receives memristive device input signals (u) from the signal generator 13. The output port of memristor 18 is connected to the source of first transistor 54. The drain of the first transistor 54 is connected to the current sensor (not shown).

Figure 6:
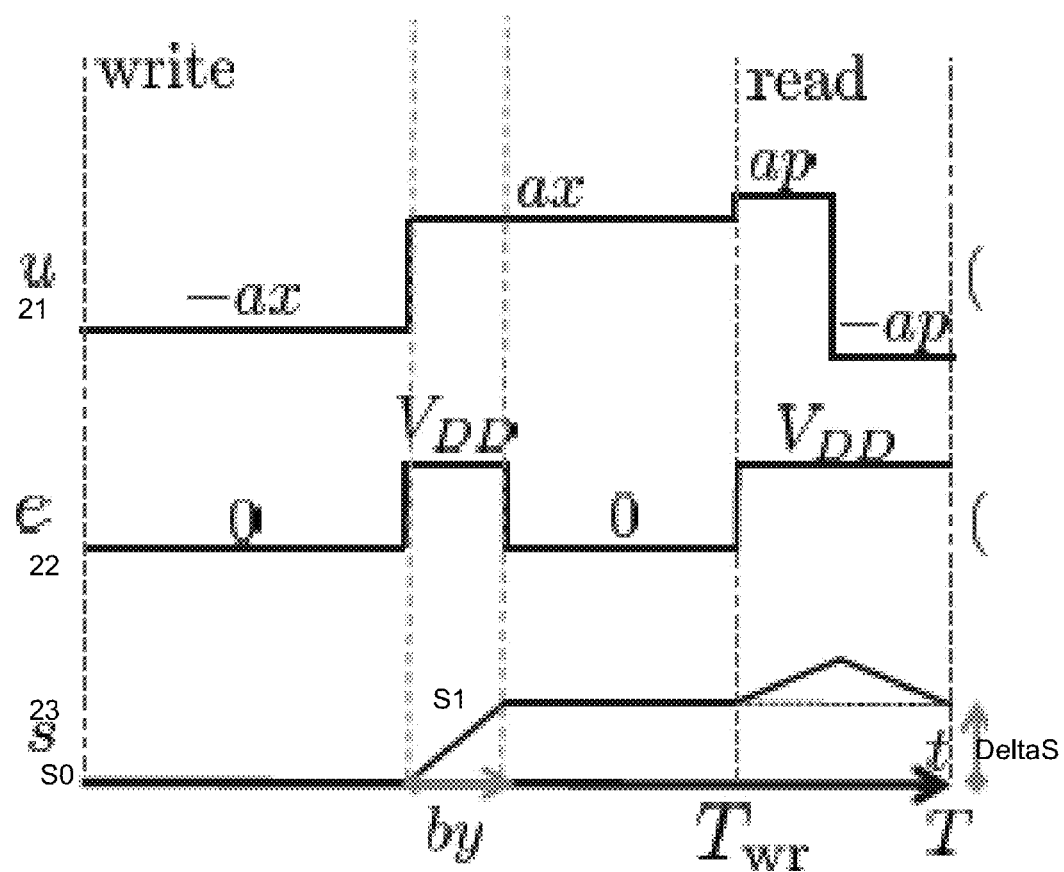
FIG. 6 is a timing according to an embodiment of the present invention.

FIG. 6 is a timing diagram 60 illustrating signals U 21, E 22 and state variable S 23 according to an embodiment of the invention.

Table 2 provides an illustration of the signals that appear in the timing diagram.

TABLE 2

| | signal | | | |
|---|---|---|---|---|
| Time | U 21 | E 22 | S 23 | ds/dt Δs |
| Zero to b\|y\| | −ax | 0 | s0 | |
| b\|y\| till $T_{wr}/2$ | ax | Vdd | Increases from s0 to s1 in a linear manner | ax |

TABLE 2-continued

| Time | U 21 | E 22 | S 23 | ds/dt | Δs |
|---|---|---|---|---|---|
| $T_{wr}/2$ till $T_{wr}$ | ax | 0 | Constant (s1) | 0 | |
| At the end of the write period | | | | | abxy |
| First part of read period $T_{wr} - (T_{wr} + T_{rd}/2)$ | ap | Vdd | Increase in a linear manner | ap | |
| Second part of read period $(T_{rd}/2 + T_{wr}) - (T_{rd} + T_{wr})$ | ap | Vdd | Decreases in a linear manner to s1 | -ap | |
| End of read period | | | | | Read period does not change Δs |

Generalization from "memristor" to "memristive devices".

Memristive devices are a generalization of the memristor.

A memristive device is a generalization of a memristor and may be defined by complying with the following equations:

$$y = g(s, u)u.$$
$$\frac{ds(t)}{dt} = f(s, u).$$

Where S is a state variable vector (s belongs to $R^D$), V is the input (current/voltage) and y is the output (current/voltage).

The behavior of a certain class of memristive devices can be defined by setting S to be a scalar and affecting the dynamics of the memristive device by a window function (s):

$$\frac{ds(t)}{dt} = f(u) * \theta(s)$$

Next assume that θ(s)>0 for all S and define $$z(s) = \int_0^s \frac{1}{\theta(x)} dx$$
$$\frac{dz(t)}{dt} = \frac{1}{\theta(s)} * \frac{ds(t)}{dt} = f(u)$$

Additionally, since z(s) is defined by an integral over a positive function, it is strictly monotone and therefore reversible to s=h(z) and:

$$y = g(h(z), u)u.$$
$$\frac{ds(t)}{dt} = f(u).$$

Such a system is mathematically very similar to the memristor system and this allows us to implement a Hebbian network in a similar method as before, with z replacing S as the synaptic weight—as the memristive device state variable.

If U is the voltage and y current, we can still use as similar method to before—assuming we can work in a (small enough) input range in which f is reversible.

We do so by making the following replacements in our memristor based method.

During the write cycle we replace the signal U(t)=ax with $U(t)=f^{-1}(ax)$ and replace the signal $\overline{U}(t)=-ax$ with $\overline{U}(t)=f^{-1}(-ax)$.

During the read cycle we keep u(t)=ap and only replace the signal $\overline{U}(t)=-ap$ with $\overline{U}(t)=f^{-1}(-f(ap))$.

Also, if we work in a small enough state space range, we can linearize g(h(z),u) and obtain $g(h(z),u)=(\overline{g}+\hat{g}z+\gamma u)$. γ did not appear in the previous equations and it may be removed using an auxiliary array (the same array that can be used for implementing negative weights)—by using non-linear resistors with similar γ corrections.

However, if U is current and y is voltage, then we need to use a different design for the synapse, such as those illustrated below.

Current Dependent Memristive Devices

For a classical memristor the kinetics of the state variable can be treated either as voltage dependent or as current dependent. However, for a general memristive system, this symmetry does not necessity hold. It is possible that the memristor will be only current dependent and not voltage dependent. In that case, we need to change the synaptic design and implementation. An example is provided in FIG. 7.

Figure 7:
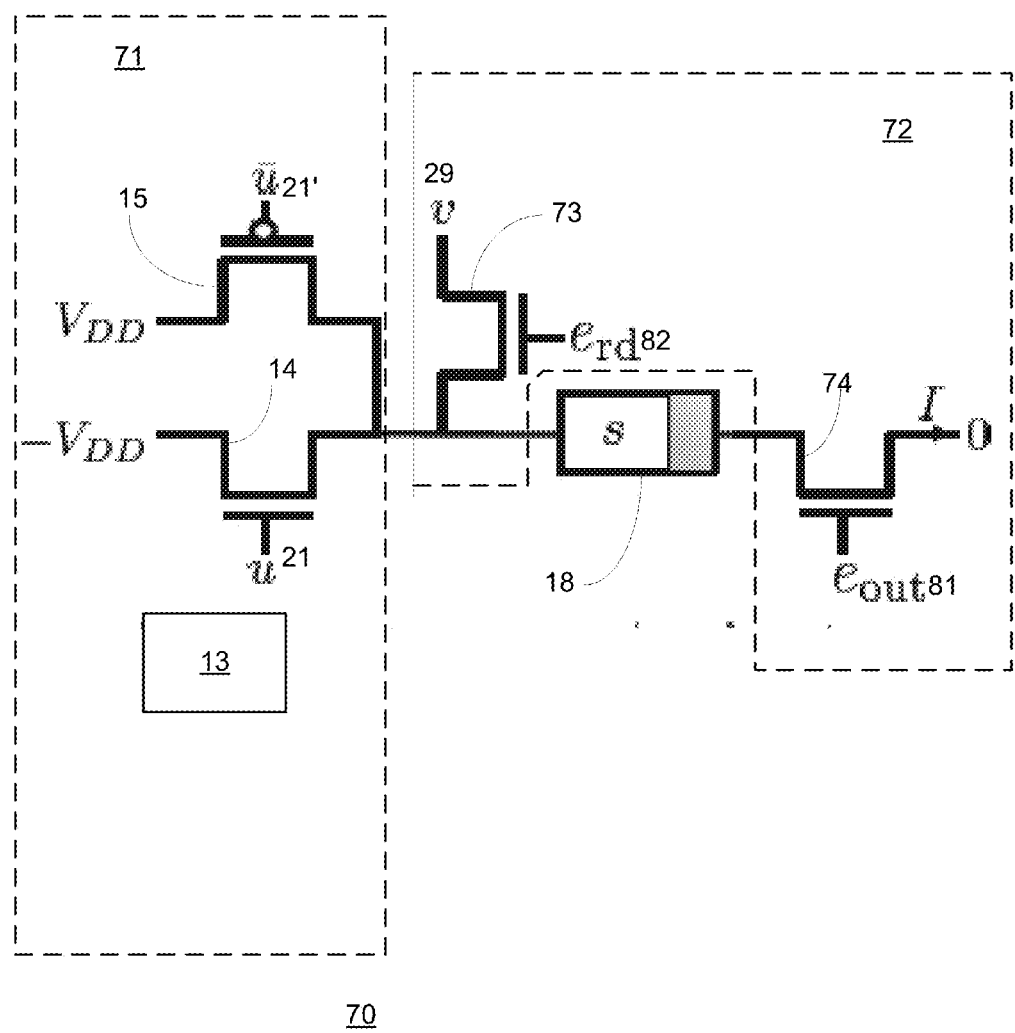
FIG. 7 is a block diagram of an analog multiplier according to an embodiment of the present invention.

FIG. 7 illustrates an analog multiplier 70 according to an embodiment of the invention.

The analog multiplier 70 includes an input circuit 71, a memristor 18 and an output circuit 72.

The input circuit 71 includes a signal generator 13, first and second transistors 14 and 15. The output circuit 72 includes a third transistor 73, a fourth transistor 74 and a current sensor (not shown).

The first transistor 14 is an N-type MOSFET transistor and the second transistor 15 is a P-type MOSFET transistor. The gate of first transistor 14 receives U and its drain receives -Vdd. The gate of second transistor 15 receives $\overline{U}$ and its drain receives Vdd.

The source of first transistor 14, the drain of second transistor 15, the drain of third transistor 73 and an input port of memristor 18 are connected to each other.

The gate of the third transistor 73 receives Eread 82 and its source receives V 29.

The output port of memristor 18 is connected to the source of fourth transistor 73. The drain of the fourth transistor 74 is connected to the current sensor (not shown). The gate of the fourth transistor 74 receives Eout 81.

Figure 8:
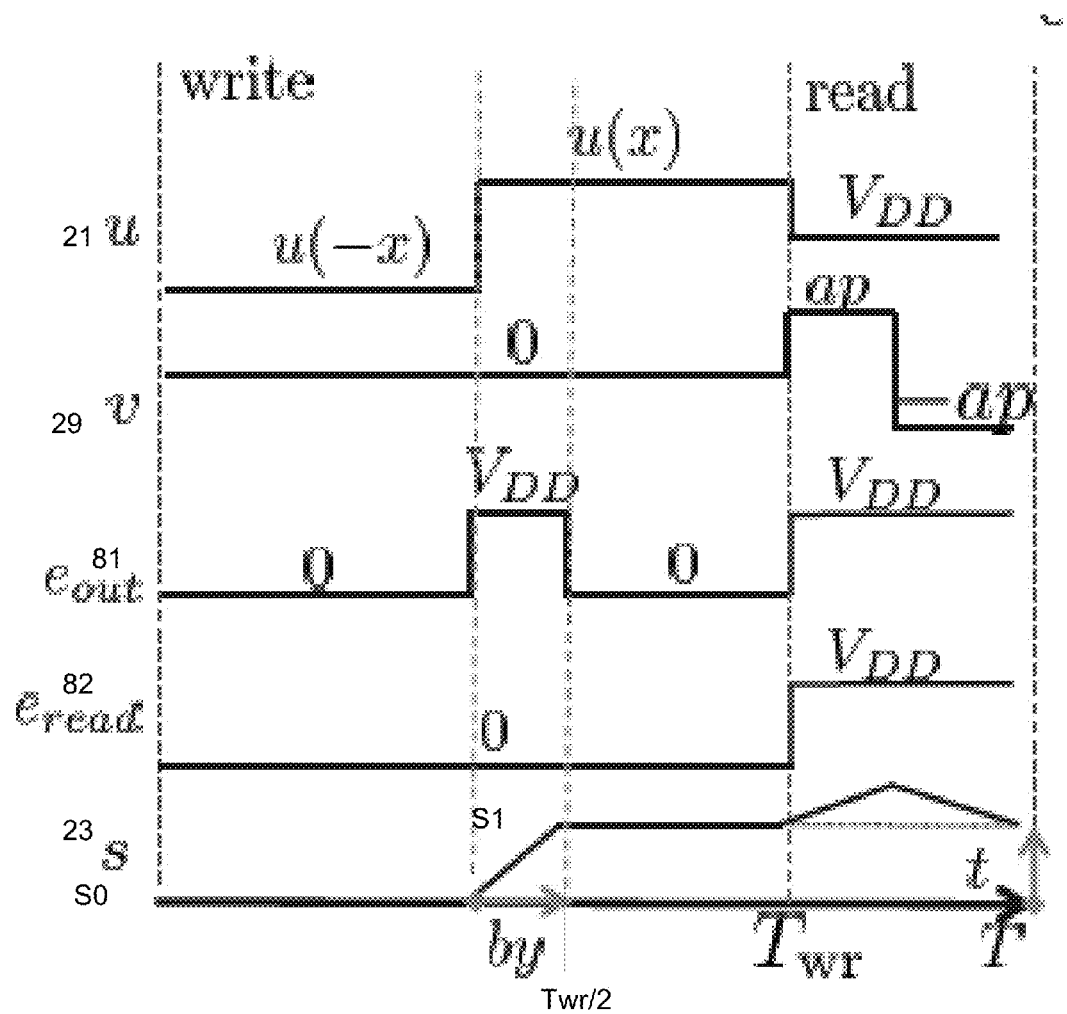
FIG. 8 is a timing according to an embodiment of the present invention.

FIG. 8 is a timing diagram 60 illustrating signals U 21, V 29, Eout to 91, Eread 82 and state variable S 23 according to an embodiment of the invention.

Table 3 provides an illustration of the signals that appear in the timing diagram.

TABLE 3

| Time | signal | | | | |
|---|---|---|---|---|---|
| | U 21 | V 29 | Eout 81 | Eread 82 | S |
| Zero to b\|y\| | u(−x) | 0 | 0 | 0 | s0 |
| b\|y\| till $T_{wr}/2$ | u(x) | 0 | Vdd | 0 | Increases from s0 to s1 in a linear manner |
| $T_{wr}/2$ till $T_{wr}$ At the end of the write period | u(x) | 0 | 0 | 0 | Constant (s1) Δs = abxy |
| First part of read period $T_{wr} - (T_{wr} + T_{rd}/2)$ | Vdd | ap | Vdd | Vdd | Increase in a linear manner |
| Second part of read period $(T_{rd}/2 + T_{wr}) - (T_{rd} + T_{wr})$ | ap | −ap | Vdd | Vdd | Decreases in a linear manner to s1 |
| End of read period | | | | | Read period does not change Δs |

Direct Voltage Multiplication

Figure 9:
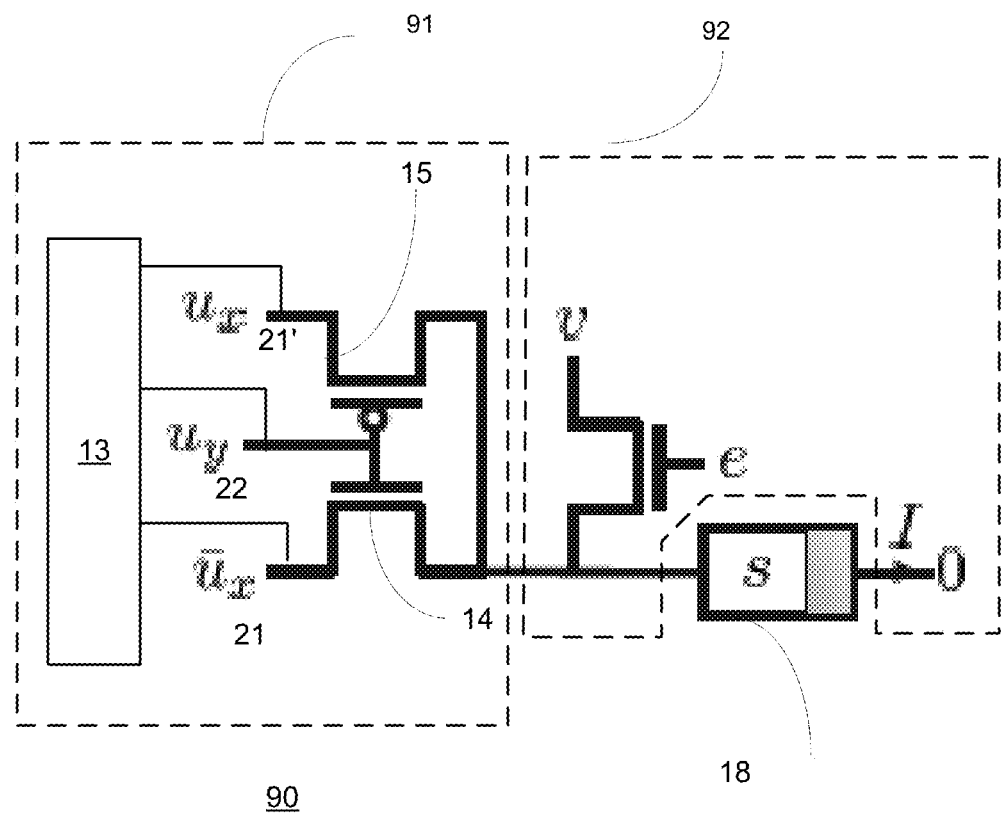
FIG. 9 is a block diagram of an analog multiplier according to an embodiment of the present invention.

FIG. 9 illustrates an embodiment of direct voltage multiplication and deviates from the time/voltage approach illustrated above.

Considering a classical current-dependent memristor and denoting by R(s) to be the state variable—the state dependent resistance of the memristor.

It is assumed that first and second transistors 14 and 15 of FIG. 9 have $V_T$=0 and a quiet small gain K so that by>>xa>>R(s). The current that flows through the memristor 18 of FIG. 9 can be I, wherein $$I = K(V_{GS} - V_T)V_{DS} - 0.5\ V_{DS}^2 = K(by - R(s)I - V_T)(ax - R(s)I) - 0.5(ax - R(s)I)^2 \approx Kabxy$$

Similarly, for all the other x,y quadrants I≈Kabxy. Denoting η=KabT$_{wr}$ and integrating over the read and write cycle (duration of $T_{rd}$+$T_{wr}$) we obtain Δs=abxy.

FIG. 9 illustrates an analog multiplier 90 according to an embodiment of the invention. The analog multiplier 90 may act as a memristive synapse.

The analog multiplier 90 includes an input circuit 91, a memristor 18 and an output circuit 92.

The input circuit 91 includes a signal generator 13, first and second transistors 14 and 15. The first transistor 14 is an N-type MOSFET transistor and the second transistor 15 is a P-type MOSFET transistor. The gates of both transistors are connected to each other are arranged to receive Uy from the signal generator 13.

An input port of memristor 18, the drain of first transistor 14, the source of second transistor 15 and a source of third transistor 92 are connected to each other. The source of first transistor 14 may receive positive memristive device input signals (Ux) and the source of second transistor 15 may receive negative memristive input signals (Ūx).

The third transistor 92 belongs to output circuit 92. The output circuit 92 also includes a current sensor (not shown). The output port of memristor 18 is connected to the current sensor.

Figure 10:
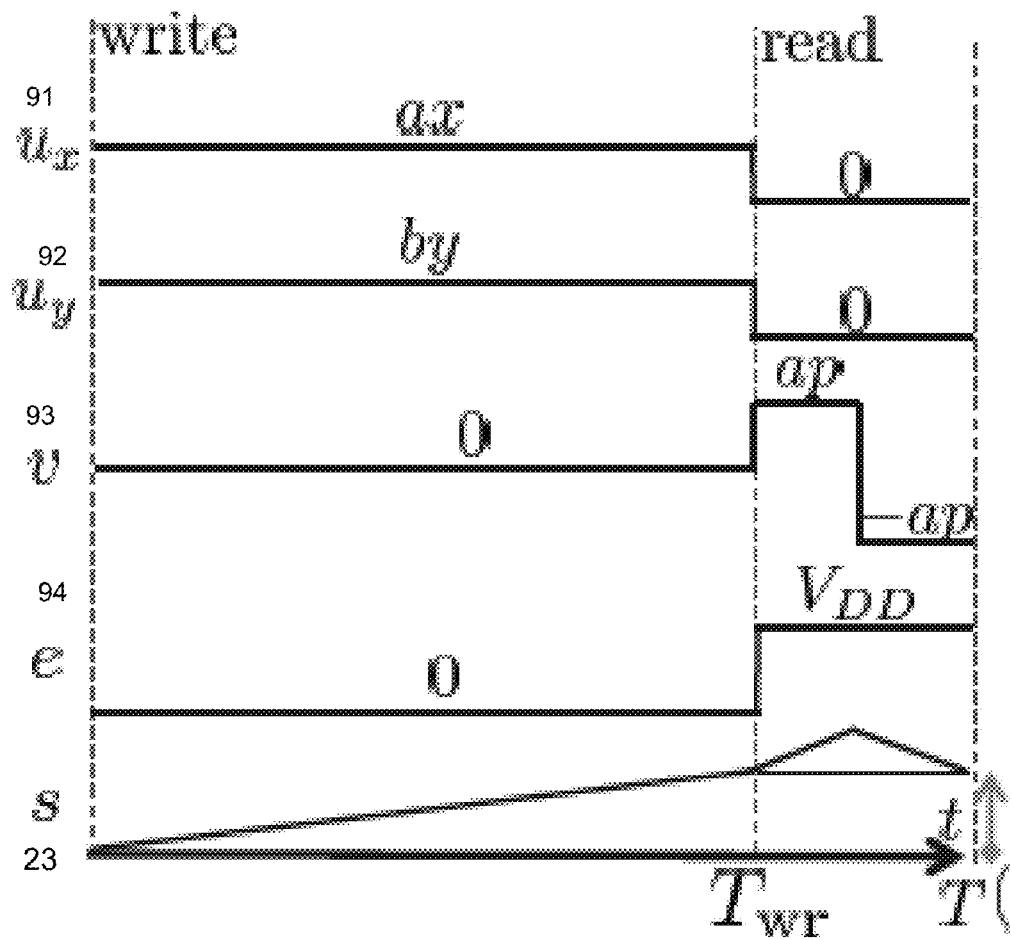
FIG. 10 is a timing according to an embodiment of the present invention.

FIG. 10 is a timing diagram 100 illustrating signals Ux 91, Uy 92, V 93, E 94 and state variable S 23 according to an embodiment of the invention.

Table 4 provides an illustration of the signals that appear in the timing diagram.

TABLE 4

| Time | signal | | | | |
|---|---|---|---|---|---|
| | Ux 91 | Uy 92 | V 93 | E 94 | S |
| Zero to $T_{wr}$ | ax | by | 0 | 0 | Increase in a linear manner from s0 to s1 Δs = abxy |
| At the end of the read period | | | | | |
| First part of write period $T_{wr} - (T_{wr} + T_{rd}/2)$ | 0 | 0 | ap | Vdd | Linearly increases |
| Second part of write period $(T_{rd}/2 + T_{wr}) - (T_{rd} + T_{wr})$ | 0 | 0 | −ap | Vdd | Linearly decreases to s1 |
| End of read period | | | | | Read period does not change Δs |

Figure 11:
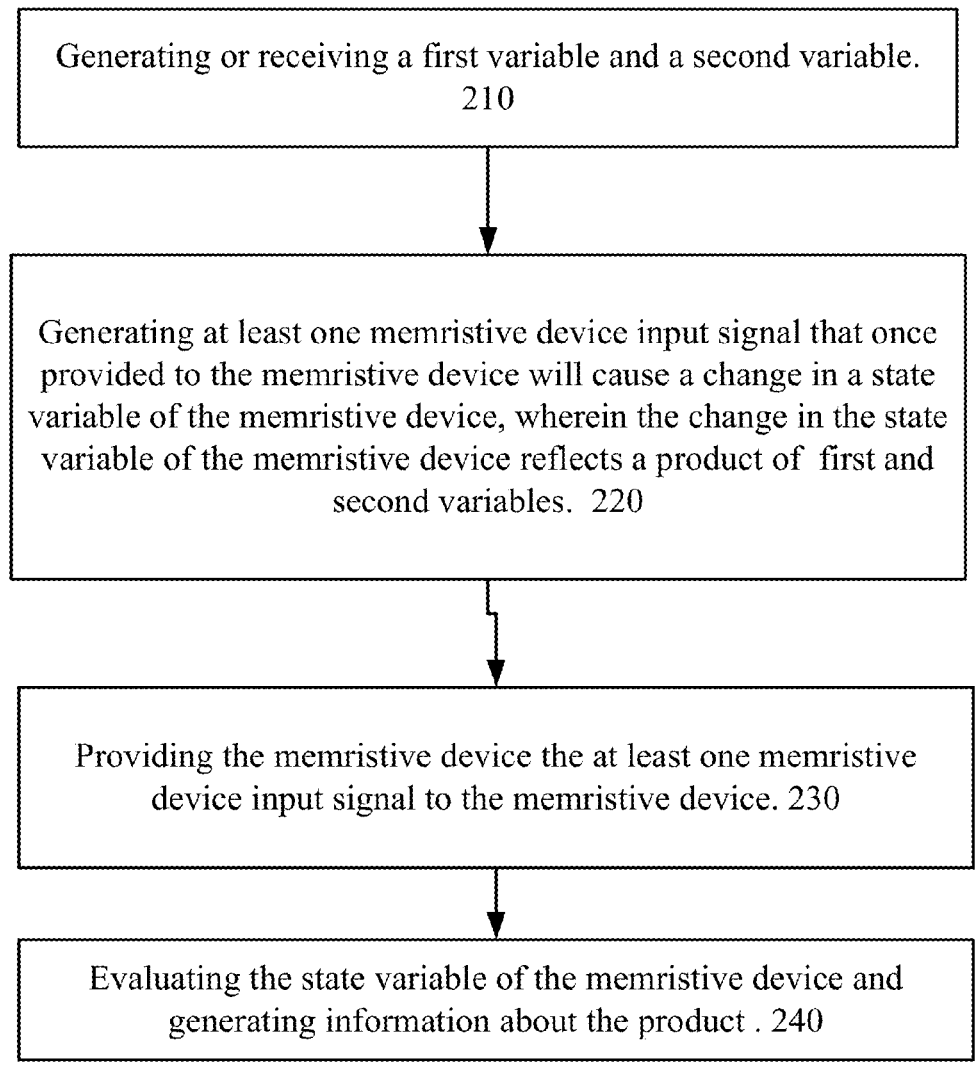
FIG. 11 illustrates a method according to an embodiment of the present invention.

FIG. 11 illustrates method 200 according to an embodiment of the invention.

Method 200 may include a sequence of stages 210, 220, 230, 240 and 250.

Stage 210 may include generating or receiving a first variable and a second variable.

Stage 220 may include generating at least one memristive device input signal that once provided to the memristive device will cause a change in a state variable of the memristive device, wherein the change in the state variable of the memristive device reflects a product of first and second variables.

Stage 230 may include providing the memristive device the at least one memristive device input signal to the memristive device.

Stage 240 may include evaluating the state variable of the memristive device and generating information about the product of the multiplication.

The memristive device may be characterized by: (a) a derivative of the state variable equals an output of a first function applied on the state variable and on the at least one memristive input signal; and (b) an output signal of the memristive device equals an output of a second function applied on the state variable and on the at least one memristive device input signal. In this case stage 220 may include generating the at least one memristive device input signal in response to the first and second functions.

Stage 220 may include generating a memristive device input signal of a value that represents the first variable and to cause the memristive device to receive the value during a duration that represents the second variable. For example, referring to FIG. 1, the enable signal can determine the duration and is a function of yb while the strength of input signal can be responsive to ax.

Stage 230 may include providing by a first transistor memristive device input signals and providing by a second transistor negative memristive device input signals. A non-limiting of a circuit implementing this stage may be included in FIGS. 1, 3, 7 and 9.

Figure 12:
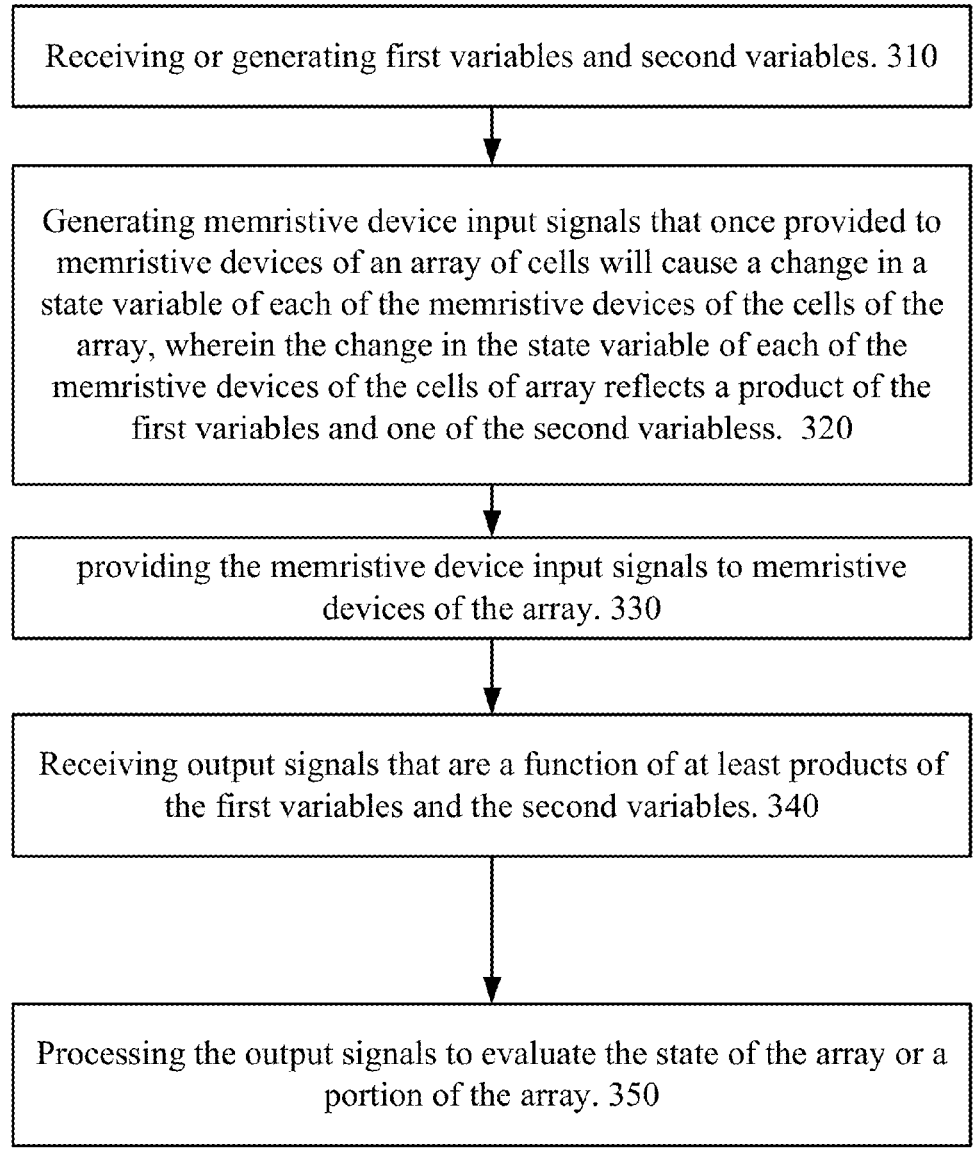
FIG. 12 illustrates a method according to an embodiment of the present invention.

FIG. 12 illustrates method 300 according to an embodiment of the invention.

Method 300 may include a sequence of stages 310, 320, 330 and 340.

Stage 310 may include receiving or generating first variables and second variables.

Stage 320 may include generating memristive device input signals that once provided to memristive devices of an array of cells will cause a change in a state variable of each of the memristive devices of the cells of the array, wherein the change in the state variable of each of the memristive devices of the cells of array reflects an outer product one of the first variables and one of the second variables.

Stage 330 may include providing the memristive device input signals to memristive devices of the array.

Stage 340 may include receiving output signals that are a function of at least products of the first variables and the second variables. These signals represent the state of the array or a portion of the array.

The array may store a matrix W, wherein the elements of the matrix W are state variable of the memristive devices. The matrix W may be multiplied during each read and write cycle by a vector p (provided during the read phase) and the difference in the value of each state variable of a memristive device of a cell (per each read and write cycle) is responsive to a multiplication of first and second variable provided to the cell.

For example, the current of each column represents the sum of all products between first and second variables provided to cells of the row.

Stage 340 may be followed by stage 350 of processing the output signals to evaluate the state of the array or a portion of the array.

Method 300 can be executed by devices that have arrays such as those illustrated in FIGS. 3 and 4.

Stage 320 may include generating memristive device input signals of values that represent the first variables and stage 330 may include causing the memristive devices to receive the values during durations that represent the second variables.

Stage 330 may include providing a same first memristive device input signal to all memristive devices of a single row of the array and sending a same second memristive device input signal to all memristive devices of a single column of the array and to read in parallel.

Stage 340 may include reading in parallel a state of memristive devices of a single column of the array.

Stage 340 may include receiving, from each column of cells, an aggregate current that is a sum of output currents of memristive devices of cells of the column Method 300 may be applied during a machine learning algorithm that involves feeding the first and second variables.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An analog multiplier, comprising:
an input circuit,
a memristor, and
an output circuit;
wherein the memristor is coupled between the input circuit and the output circuit;
wherein the input circuit is arranged to:
receive or generate a first variable and a second variable;
generate at least one memristive device input signal that once provided to the memristor will cause a change in a state variable of the memristor, wherein the change in the state variable of the memristor reflects a product of the first and second variables;
provide to the memristor the at least one memristive device input signal; and
wherein the output circuit is arranged to evaluate the state variable of the memristor and to generate information about the above product.

2. The analog multiplier according to claim 1, wherein a derivative of the state variable equals an output of a first function applied on the state variable and on the at least one memristive input signal; and
an output signal of the memristor equals a product of the at least one memristive device input signal and an output of a second function applied on the state variable and on the at least one memristive device input signal;
wherein the input circuit is arranged to generate the at least one memristive device input signal in response to the first and second functions.

3. The analog multiplier according to claim 1, wherein the input circuit is configured to provide to the memristor the at least one memristive device input signal through a single transistor.

4. The analog multiplier according to claim 1, wherein the input circuit is arranged to generate a memristive device input signal of a value that represents the first variable and to cause the memristor to receive the value during a duration that represents the second variable.

5. The analog multiplier according to claim 1, wherein the at least one memristive device input signal is a voltage signal.

6. The analog multiplier according to claim 1, wherein the at least one memristive device input signal is a current signal.

7. The analog multiplier according to claim 1, wherein the input circuit comprises first and second transistors, the first transistor is arranged to provide positive memristive device input signals and the second transistor is arranged to provide negative memristive device input signals.

8. A device, comprising:
an array of cells, wherein the cells are arranged in columns and rows; wherein each cell comprises a single memristor;
an interfacing circuit that is coupled to each cell of the array of cells;
wherein the interfacing circuit is arranged to:
receive or generate first variables and second variables;
generate memristive device input signals that once provided to memristors of the array will cause a change in a state variable of each of the memristors of the array, wherein the change in the state variable of each of the memristors of the array reflects a product of one of the first variables and one of the second variables;
provide the memristive device input signals to memristors of the array; and
receive output signals that are a function of at least products of the first variables and the second variables.

9. The analog multiplier according to claim 1 wherein the output circuit is arranged to evaluate the state variable of the memristor by providing to the memristor a memristive device input signal of a first value during a first half of a read period and providing to the memristor the memristive device input signal of a second value during a second half of the read period; wherein the first value is an additive inverse of the second value.

10. The device according to claim 8, wherein the interfacing circuit is arranged to generate memristive device input signals of values that represents the first variables and to cause the memristors to receive the values during durations that represent the second variables.

11. The device according to claim 8, wherein the interfacing circuit is arranged to:
provide a same first memristive device input signal to all memristors of a single row of the array;
send a same second memristive device input signal to all memristors of a single column of the array; and
read in parallel states of memristors of a single column of the array.

12. The device according to claim 8 comprising an additional array of cells, wherein the cells of the additional array are arranged in columns and rows; wherein each cell of the additional array comprises a single memristor that is configured to perform a subtraction operation on a weight associated a corresponding cell of the array.

13. The device according to claim 8, wherein the interfacing circuit is arranged to receive, from each column of cells, an aggregate current that is a sum of output currents of memristors of cells of the column.

14. The device according to claim 8, wherein the interfacing circuit and the array of cells form an array of synapses.

15. The device according to claim 8, comprising a machine learning controller that is arranged to execute machine learning algorithms that involve feeding to the interfacing circuit the first and second variables.

16. A method for analog multiplication of a first variable and a second variable, the method comprises:
generating or receiving the first variable and the second variable;
generating at least one memristive device input signal that once provided to a memristor will cause a change in a state variable of the memristor, wherein the change in the state variable of the memristor reflects a product of the first and second variables;
providing to the memristor the at least one memristive device input signal;
evaluating the state variable of the memristor; and
generating information about the product.

17. The method according to claim 16, wherein a derivative of the state variable equals an output of a first function applied on the state variable and on the at least one memristive input signal; and an output signal of the memristor equals a product of the at least one memristive device input signal and an output of a second function applied on the state variable and on the at least one memristive device input signal; and wherein the method comprises generating the at least one memristive device input signal in response to the first and second functions.

18. The method according to claim 16, comprising providing to the memristor the at least one memristive device input signal through a single transistor.

19. The method according to claim 16, comprising generating a memristive device input signal of a value that represents the first variable and causing the memristor to receive the value during a duration that represents the second variable.

20. The method according to claim 16, wherein the at least one memristive device input signal is a voltage signal.

21. The method according to claim 16, wherein the at least one memristive device input signal is a current signal.

22. The method according to claim 16, comprising providing by a first transistor memristive device input signals and providing by a second transistor negative memristive device input signals.

23. A method, comprising:

receiving or generating first variables and second variables;

generating memristive device input signals that once provided to memristors of an array of cells will cause a change in a state variable of each of the memristors of the cells of the array, wherein the change in the state variable of each of the memristors of the cells of the array reflects a product of one of the first variables and one of the second variables;

providing the memristive device input signals to the memristors of the array; and receiving output signals that are a function of at least products of the first variables and the second variables.

* * * * *